US010815064B1

(12) United States Patent
Ahmed

(10) Patent No.: US 10,815,064 B1
(45) Date of Patent: Oct. 27, 2020

(54) SYSTEMS AND METHODS FOR CONTROLLING THE DISPENSING OF ARTICLES

(71) Applicant: Gulzar Ahmed, Tualatin, OR (US)

(72) Inventor: Gulzar Ahmed, Tualatin, OR (US)

( * ) Notice: Subject to any disclaimer, the term of this patent is extended or adjusted under 35 U.S.C. 154(b) by 34 days.

(21) Appl. No.: 16/231,069

(22) Filed: Dec. 21, 2018

Related U.S. Application Data

(60) Provisional application No. 62/609,828, filed on Dec. 22, 2017.

(51) Int. Cl.
*B65G 27/34* (2006.01)
*B65G 27/16* (2006.01)
*B65G 27/32* (2006.01)
*B65G 65/20* (2006.01)
*B65G 27/04* (2006.01)

(52) U.S. Cl.
CPC .............. *B65G 27/34* (2013.01); *B65G 27/04* (2013.01); *B65G 65/20* (2013.01); *B65G 2207/14* (2013.01); *B65G 2812/0388* (2013.01)

(58) Field of Classification Search
CPC ........ B65G 27/16; B65G 27/32; B65G 27/34; B65G 65/20
USPC .............. 198/527, 609, 752.1, 758; 177/119; 221/201
See application file for complete search history.

(56) References Cited

U.S. PATENT DOCUMENTS

| 2,670,921 A | 3/1954 | Dodd et al. |
| 3,155,183 A | 11/1964 | Bradford |
| 3,643,753 A | 2/1972 | Godwin et al. |
| 3,695,371 A | 10/1972 | Sheetz |
| 3,730,386 A | 5/1973 | Monsees |
| 3,913,691 A * | 10/1975 | Powell, Jr. .............. G01G 1/246 177/202 |
| 4,513,830 A | 4/1985 | Persbeck et al. |
| 4,540,082 A | 9/1985 | Maddocks |
| 4,570,419 A | 2/1986 | Tinsley |
| RE32,102 E | 4/1986 | Ricciardi et al. |
| 4,580,698 A | 4/1986 | Ladt et al. |
| 4,660,664 A | 4/1987 | Petersen |
| 4,682,664 A | 7/1987 | Kemp |
| 4,708,215 A | 11/1987 | Nakamura et al. |
| 4,730,499 A | 3/1988 | Gianella et al. |
| 4,809,795 A | 3/1989 | Neumann |
| 4,901,807 A | 2/1990 | Muskat et al. |
| 4,901,841 A * | 2/1990 | Haggerty ................ B65B 35/34 198/358 |
| 4,979,608 A | 12/1990 | Mikata |
| 5,002,140 A | 3/1991 | Neumiller |
| 5,105,930 A * | 4/1992 | Spatafora ........... B65G 47/5145 198/453 |
| 5,191,947 A | 3/1993 | Petersen |
| 5,338,901 A | 8/1994 | Dietrich |

(Continued)

FOREIGN PATENT DOCUMENTS

EP 2664551 11/2013

*Primary Examiner* — Douglas A Hess
(74) *Attorney, Agent, or Firm* — J. Curtis Edmondson; Law Offices of J. Curtis Edmondson

(57) ABSTRACT

An article dispensing system and method that has a first and a second vibratory feeder; a rotary trough dispenser having one or more receiving troughs in which counted or weighed articles are dispensed for packaging; while the next trough within the rotary trough dispenser is indexed in a rotational step-wise fashion.

14 Claims, 5 Drawing Sheets

(56) References Cited

U.S. PATENT DOCUMENTS

| | | | |
|---|---|---|---|
| 5,341,307 A | | 8/1994 | Myhre et al. |
| 5,463,839 A | * | 11/1995 | Stange .................. B65B 57/20 |
| | | | 53/54 |
| 5,639,995 A | | 6/1997 | Mosher |
| 5,780,780 A | | 7/1998 | Ahmed |
| 6,407,346 B1 | * | 6/2002 | Baker .................. G01G 13/22 |
| | | | 177/119 |
| 6,441,321 B1 | * | 8/2002 | Hebenstreit ............. A21C 5/00 |
| | | | 177/116 |
| 6,462,288 B1 | | 10/2002 | Wong |
| 6,848,568 B1 | | 2/2005 | Nibler |
| 8,710,379 B2 | | 4/2014 | Ahmed |
| 8,857,601 B2 | * | 10/2014 | Taylor .................. B65G 27/12 |
| | | | 198/750.1 |
| 10,121,307 B2 | | 11/2018 | Ahmed |
| 2006/0090985 A1 | | 5/2006 | Taylor |
| 2013/0048470 A1 | | 2/2013 | Knodell, Jr. |
| 2017/0144831 A1 | | 5/2017 | Hodgson |

* cited by examiner

SYSTEMS AND METHODS FOR CONTROLLING THE DISPENSING OF ARTICLES

CROSS REFERENCES TO RELATED APPLICATIONS

This application claims the benefit of U.S. Provisional Patent Application No. 62/609,828, filed Dec. 22, 2017, entitled as "System, Apparatus and Methods for Counting and Weighing a Product", which is incorporated herein by reference in its entirety.

BACKGROUND

This disclosure includes systems and methods for controlling the dispensing of articles, controlling vibratory feeders for dispensing the articles one article at a time, dispensing different types of articles at different rates, counting the dispensed articles, measuring the weight of the dispensed articles, and dispensing counted or measured groupings of the articles for packaging in controlled quantities and amounts.

Instrumentation for arranging articles in a single file arrangement and counting the articles into predetermined groups is achieved by designing machines peculiarly adapted to the particular articles, but such instrumentation can be so specific in its design to preclude use in the arrangement and counting of various articles across different industries.

The accuracy of a count or a measurement, or both of dispensed articles eases packaging complexities and optimizes total cost associated with packaging of a final grouping of the articles for retail.

SUMMARY

A broad object of embodiments can be an article dispensing system including a first vibratory feeder having a first vibratory feeder infeed end and a first vibratory feeder discharge end, a second vibratory feeder having a second vibratory feeder infeed end and a second vibratory discharge end, the second vibratory feeder infeed end in-line and disposed below the first vibratory feeder discharge end, a rotary trough dispenser with one or more troughs, the rotary trough dispenser in-line with and disposed below the second vibratory feeder dispensing end; a first oscillatory drive operably connected to the first vibratory feeder, wherein the first oscillatory drive imparts periodic movements urging the articles toward the first vibratory feeder discharge end, a second oscillatory drive operably connected to the second vibratory feeder, wherein the second oscillatory drive imparts periodic movements urging the articles toward the second vibratory feeder discharge end, a controller operably connected to the oscillatory drive, a sensor operably connected to the controller, and a transducer operably connected to the controller.

Another broad object of embodiments can be a method of counting singulated articles, including feeding articles into a first vibratory feeder, initiating vibratory motion of the vibratory feeder, urging the articles to a second vibratory feeder, arranging the articles in a single row, discharging one-at-a-time the articles from the second vibratory feeder to a rotary trough dispenser, counting the singulated articles, rotating the rotary trough dispenser once a desired count is attained, and dispensing the articles in packaging containers.

Yet another broad object of embodiments can be a method of weighing singulated articles, including feeding articles into a first vibratory feeder, initiating vibratory motion of the vibratory feeder, urging the articles to a second vibratory feeder, arranging the articles in a single row, discharging one-at-a-time the articles from the second vibratory feeder to a rotary trough dispenser, weighing the singulated articles discharged into a trough of the rotary trough dispenser, rotating the rotary trough dispenser once a desired weight is attained, and dispensing the articles in packaging containers.

It should be understood that the summary above is provided to introduce in simplified form a selection of examples that are further described in the detailed description. It is not meant to identify key or essential features of any claimed subject matter that may later claim priority to the present description. Furthermore, the scope of any such claimed subject matter would not be limited to implementations that solve any disadvantages noted above or contained herein.

DETAILED DESCRIPTION

Figure 1:
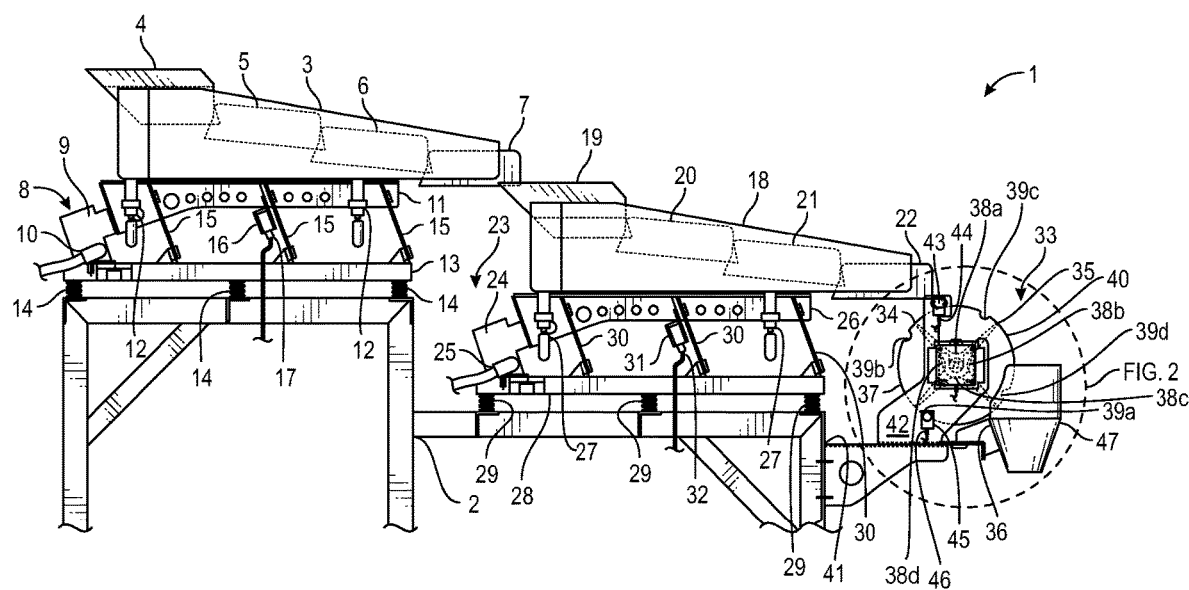
FIG. 1 is a side view of an embodiment of an article dispensing system.

Now referring to the figures wherein like reference numerals denote like structure throughout the specification, with reference primarily to FIG. 1, which depicts an article dispensing system (1), including a first vibratory feeder (3) and a second vibratory feeder (18) in a cascading arrangement for a continuous flow delivery of the articles one at a time to a rotary trough dispenser (33).

An article dispensing system (1) according to various embodiments is supported by frame (2). The frame (2) can be a suitable framework capable of supporting the various components of the article dispensing system (1). The illustrative example of the frame (2) is not intended to preclude embodiments which incorporate similar or equivalent framework, currently or prospectively available.

With continuing reference, primarily to FIG. 1, vibratory feeder (3) is mounted on frame (2). Vibratory feeder (3) includes an infeed pan (4) shaped to receive a batch product in bulk quantity to be delivered for individual packaging of articles or groups of articles. The product or batch product can be any ungrouped material for dispensation, including food and food materials, electrical and mechanical hardware, and packaged goods.

In various other embodiments, other types of product that may require selective singulation of articles comprised within the product can, but not necessarily, be used with the article dispensing system (1).

Figure 3:
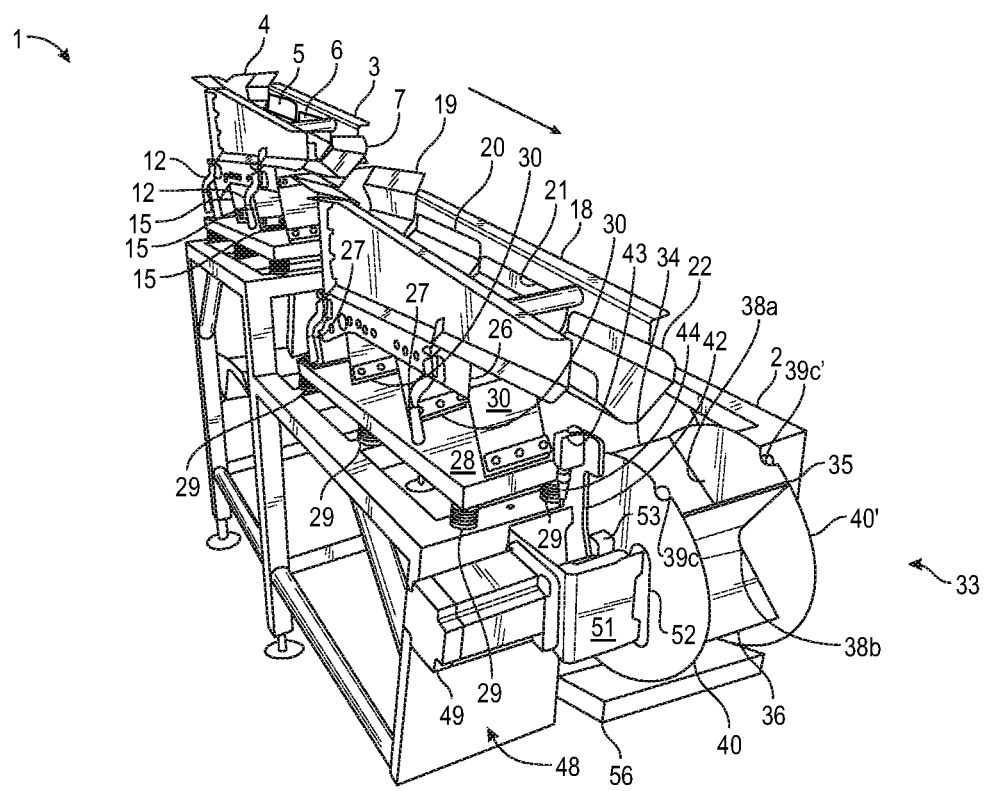
FIG. 3 is a front, top, perspective view of an embodiment of an article dispensing system.

Referring primarily to FIG. 1 and FIG. 3, vibratory feeder (3) includes, in addition to the infeed pan (4), singulation pan (5), singulation pan (6), and discharge pan (7), all of which can be U-shaped in cross-section so that articles being moved tend to gravitate generally toward the center line of the vibratory feeder (3) and each of the pans (5), (6), and (7).

Referring primarily to FIG. 1, vibratory feeder (3) and pans (4), (5), (6), and (7) can be monolithically, smoothly, and rigidly formed and constructed from, for example, fluoropolymer resins and stainless steel for ease of cleaning. Alternatively, vibratory feeder (3) and pans (4), (5), (6), and (7) can be plated or coated with one or more such materials or antimicrobial materials for use with being maintained in a sanitary condition. Pans (4), (5), (6), and (7) can include fasteners for easy removal, cleaning, and replacement within the U-shaped cross section of the vibratory feeder (3).

With continuing reference primarily to FIG. 1, vibratory feeder (3), including pans (4), (5), (6), and (7) are driven to have oscillatory, periodic movements so as to convey the articles and eventually, with the use of one or more vibratory feeders (18), singulate the articles into a single row. The periodic movements can be imparted by any number of methods, such as electrical, mechanical, electromechanical, electromagnetism, and ferromagnetism. The periodic movements can, but not necessarily, be obtained by applying a changing magnetic flux across a ferrous metal or other magnetically permeable material bridge in the form of a drive assembly (8) having a drive unit (9) and power supply (10) coupled to vibratory feeder (3). The drive unit (9) can have a stroke that is variable with power (10) supplied to the drive unit (9).

Still referring primarily to FIG. 1, vibratory feeder (3) can be driven to have oscillatory, periodic movements at rates ranging from 10 Hertz to 100 Hertz, through the use of drive assembly (8) to deliver the articles to a second vibratory feeder (18). Movement in a desired direction of the articles is achieved with the periodic movements imparted by drive assembly (8) as well as through the assistance of gravity, which is obtained by angling the pans (5), (6), (7) downward from infeed pan (4) within vibratory feeder (3).

Again, referring primarily to FIG. 1, feeder support (11) can provide a horizontal support for vibratory feeder (3). The drive assembly (8) can connect to the feeder support (11) to impart vibrations to the vibratory feeder (3). Clamps (12) can be used to hold and release the vibratory feeder (3) to and from the feeder support (11). One or more clamps (12) may be used. In one embodiment, a total of four clamps (12) can be used, two clamps (12) on each side of the vibratory feeder (3). The clamps (12) can, but not necessarily, be manual toggle clamps.

Referring primarily to FIG. 1 and FIG. 3, compliant members (15) associated with vibratory feeder (3) and drive assembly (8) couple the vibratory feeder (3) to feeder platform (13). The compliant members (15) can, but not necessarily, be leaf springs, permitting bending movement of the vibratory feeder (3). One or more compliant members (15) can be used for vibratory feeder (3). Compliant members (15) can be formed of fiberglass; however, steel or other spring-material may be employed, as well. For feeding articles in a forward direction, the compliant members (15) are angled with respect off the vertical so that forward motion of the vibratory feeder (3) causes the vibratory feeder (3) to rise upwardly and forwardly along an arc defined by the length of the compliant member (15), while reverse motion of the vibratory feeder (3) causes the vibratory feeder (3) to fall backwardly and downwardly along the arc.

Referring primarily once again to FIG. 1, dampener members (14) are disposed between the feeder platform (13) and the frame (2). Dampener members (14) can, but not necessarily, be springs to dampen any movement of the vibratory feeder (3), feeder platform (13), and drive assembly (8) relative to the frame (2). A total of six dampener members (14) can be used, three dampener members (14) per each longitudinal side of the feeder platform (13).

Referring primarily to FIG. 1, an oscillation feedback sensor (16) can be used to attenuate the vibration movement of the vibratory feeder (3). The oscillation feedback sensor (16) can couple to one compliant member (15) within the series of compliant members (15) used. Power supply (17) is provided by the central system controller.

Referring again primarily to FIG. 1 and FIG. 3, vibratory feeder (18) is mounted on frame (2) inline and below vibratory feeder (3). Vibratory feeder (18) can be a second feeder used in conjunction with vibratory feeder (3) and each vibratory feeder (3), (18) is interchangeable with the other. Vibratory feeder (18) includes an infeed pan (19) shaped to receive articles from the discharge pan (7) of vibratory feeder (3) of the article dispensing system (1). The illustrative examples of vibratory feeder (3) and vibratory feeder (18) are not intended to preclude embodiments which incorporate more or less feeders in number or sequence, or similar or equivalent conveyors, currently or prospectively available.

Still referring primarily to FIG. 1 and FIG. 3, vibratory feeder (18) includes singulation pan (20), singulation pan (21), and discharge pan (22), all of which can be U-shape in cross-section. The illustrative examples of pans (5), (6), (7), and (20), (21), (22) are not intended to preclude embodiments which incorporate more or less pans in number or sequence, or similar or equivalent chutes, currently or prospectively available.

With continuing reference primarily to FIG. 1 and FIG. 3, vibratory feeder (18) and pans (19), (20), (21), and (22) can be monolithically, smoothly, and rigidly formed and constructed from, for example, fluoropolymer resins and stainless steel for ease of cleaning. Alternatively, vibratory feeder (18) and pans (19), (20), (21), and (22) can be plated or coated with one or more such materials or antimicrobial materials for use with being maintained in a sanitary condition. Pans (20), (21), (22), and (23) can include fasteners for easy removal, cleaning, and replacement within the U-shaped cross section of the vibratory feeder (18).

Again, with continuing reference primarily to FIG. 1 and FIG. 3, vibratory feeder (18) and pans (20), (21), (22), and (23) are driven to have oscillatory, periodic movements so as to convey the articles and eventually singulate the articles into a single row for dispensation into the rotary trough dispenser (33). The periodic movements can be imparted by any number of methods, such as electrical, mechanical, electromechanical, electromagnetism, and ferromagnetism. The periodic movements can be, but not necessarily obtained by applying a changing magnetic flux across a ferrous metal or other magnetically permeable material bridge in the form of a drive assembly (23) having a drive unit (24) and power supply (25) attached to vibratory feeder (18). The drive unit (24) can have a stroke that is variable with power (25) supplied to the drive unit (24).

Still referring primarily to FIG. 1 and FIG. 3, vibratory feeder (18) can be driven to have oscillatory, periodic movements at rates ranging from 10 Hertz to 100 Hertz, through the use of drive assembly (23) to deliver singulated articles to the rotary trough dispenser (33). Movement in a desired direction of the articles is achieved with the periodic movements imparted by drive assembly (8) and gravity. The assistance of gravity is obtained by angling the pans (20), (21), (22) downward from infeed pan (19) within vibratory feeder (18), which is angled below and in-line with vibratory feeder (3).

With continuing reference still primarily to FIG. 1 and FIG. 3, feeder support (26) can provide a horizontal support for vibratory feeder (18) on a portion of the frame (2) allowing a second vibratory feeder (18) to be disposed in-line and below the first vibratory feeder (3). The drive assembly (23) can couple to the feeder support (26) to impart vibrations to the vibratory feeder (18). Clamps (27) can be used to hold and release the vibratory feeder (18) to and from the feeder support (26). One or more clamps (27) may be used. In one embodiment, a total of four clamps (27) can be used, two clamps (27) on each side of the vibratory feeder (18). The clamps (27) can, but not necessarily, be manual toggle clamps.

Referring primarily to FIG. 1 and FIG. 3, compliant members (30) associated with vibratory feeder (18) and drive assembly (23) couple the vibratory feeder (18) to feeder platform (28). The compliant members (30) can, but not necessarily, be leaf springs, permitting bending movement of the vibratory feeder (18). One or more compliant members (30) can be used for vibratory feeder (18). Compliant members (30) can be formed of fiberglass; however, steel or other spring-material may be employed, as well. For feeding articles in a forward direction, the compliant members (30) are angled with respect off the vertical so that forward motion of the vibratory feeder (18) causes the vibratory feeder (18) to rise upwardly and forwardly along an arc defined by the length of the compliant member (30), while reverse motion of the vibratory feeder (18) causes the vibratory feeder (18) to fall backwardly and downwardly along the arc.

Still with continuing reference primarily to FIG. 1 and FIG. 3, dampener members (29) are disposed between the feeder platform (28) and the frame (2). Dampener members (29) can, but not necessarily, be springs to dampen any movement of the vibratory feeder (18), feeder platform (28), and drive assembly (23) relative to the frame (2). A total of six dampener members (29) can be used, three dampener members (29) per each longitudinal side of the feeder platform (28).

Once again, with continuing reference primarily to FIG. 1, an oscillation feedback sensor (31) can be used to attenuate the vibration movement of the vibratory feeder (18). The oscillation feedback sensor (31) can couple to one of the compliant members (30) within the series of compliant members (30) used. Power supply (32) is provided by the central system controller.

Figure 2:
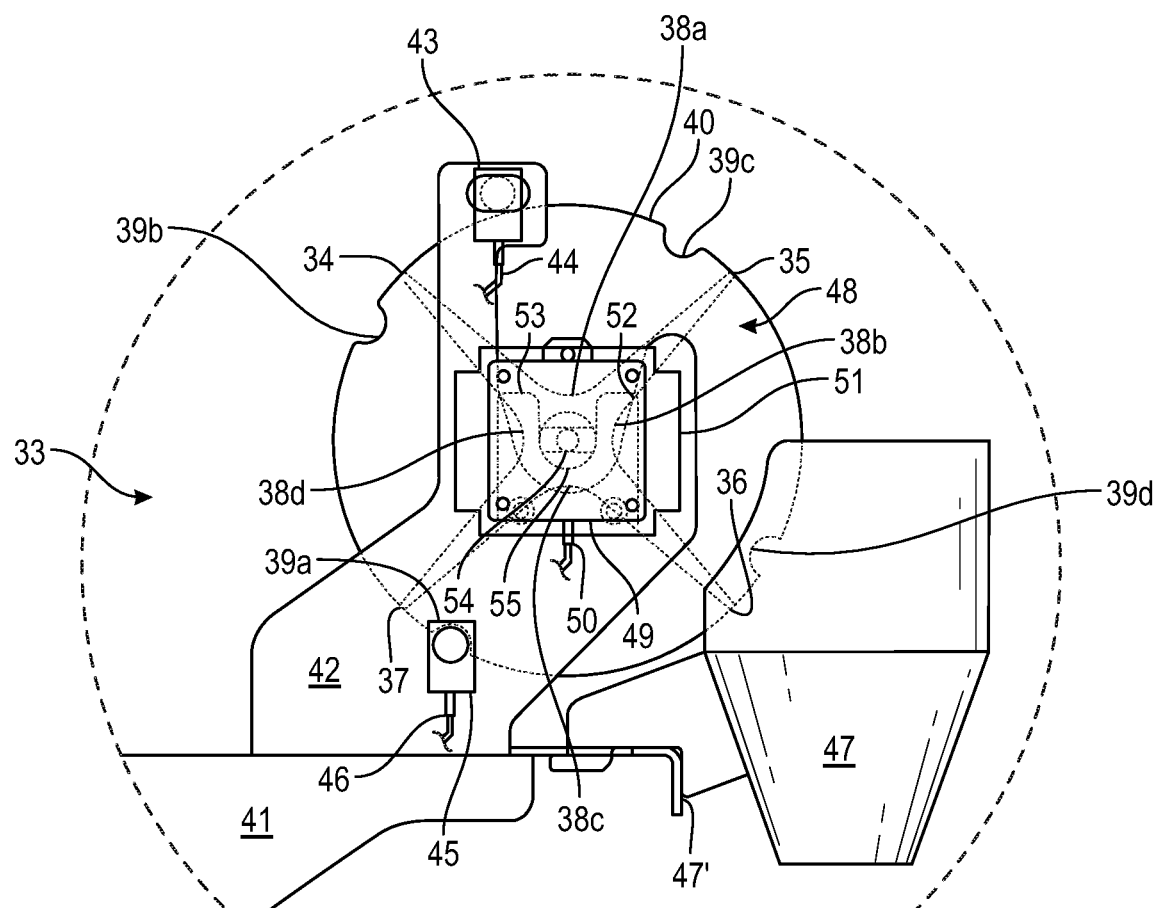
FIG. 2 is a close-up view of a rotary trough dispenser of an embodiment of an article dispensing system.

Now referring primarily to FIG. 1, FIG. 2, and FIG. 3, the vibratory feeders (3), (18) can be operated at successively higher rates, thus tending to spread the articles out and arrange them in single file order. The rate of operation of vibratory feeder (3), (18) is intended to refer to the rate of advance of articles, whether it be dependent on the speed of vibration or the amplitude, or both.

Referring primarily to FIG. 2, and with continuing reference primarily to FIG. 1 and FIG. 3, rotary trough dispenser (33) can be mountable to and releasable from the frame (2) by way of dispenser mount (42), allowing the rotary trough dispenser (33) to be adjustably disposed in a position to catch the discharged articles from discharge pan (22). Bracket (41) coupled to frame (2) can be used to support dispenser mount (42). The rotary trough dispenser (33) can be a star wheel configuration having dividers (34), (35), (36), and (37) extending radially to the perimeter blades (40), (40') of the rotary trough dispenser (33). Troughs (38A), (38B), (38C), and (38D) are formed between the dividers (34), (35), (36), and (37). The rotary trough dispenser (33) can be rotated and indexed to the next successive trough (38B) by way of an actuator (48). Actuator (48) can be a stepper motor (49) with a power (50) supply, a housing (51) with a cutout (52), a U-shape bearing (53), and a shaft and screw assembly (54) in operation with a rotor assembly (55).

Referring again primarily to FIG. 1, FIG. 2, and FIG. 3, count sensor (43) with power (44) supply in electrical communication with the central system controller can be used to count discharged articles one at a time from the discharge pan (22) of vibratory feeder (18). The count sensor (43) includes a signal corresponding to the number of the articles discharged from discharge pan (22) of vibratory feeder (18). The count sensor (43) can, but not necessarily, be radar, laser, ultrasonic, optical (diffuse scan), photo-electric, and proximity sensors. The singulated and counted articles are accumulated in a trough (38A) then, when the rotary trough dispenser (33) is indexed via the actuator (48) in communication with the central system controller, the counted articles are dispensed in containers that are stationed on a conveyor travelling in perpendicular motion to the rotary trough dispenser (33).

With continuing reference still, primarily to FIG. 1, FIG. 2, and FIG. 3, catches (39A), (39B), (39C), and (39D) on blade (40), and catches (39A'), (39B'), (39C'), and (39D') (only (39C) is shown) on blade (40') of the rotary trough dispenser (33) of the article dispensing system (1) employ a stop sensor (45) with power (46) supply in electrical communication with the central system controller. The stop sensor (45) senses the catches (39A), (39B), (39C), and (39D) on blade (40) in electrical communication with the central system controller, which operates the actuator (48). A stop sensor (45') (not shown) can be configured on blade (40') in operation with catches (39A'), (39B'), (39C'), and (39D') (only (39C') is shown), as well. The stop sensor (45) can, but not necessarily, be radar, laser, ultrasonic, optical (diffuse scan), photo-electric, and proximity sensors.

With continuing reference primarily to FIG. 1 and FIG. 2, vertical chute (47) with an attenuated conical shape and an open-ended top hood can be substantially dome-shaped or substantially conical-shaped or both to allow dispensation of the articles to a packaging container disposed below the vertical chute (47).

With continuing reference primarily to FIG. 3, a transducer load cell (56) can be disposed between the rotary trough dispenser (33) and bracket (41). The transducer load cell (56) comprises a signal corresponding to the weight of the articles received in each trough (38A), (38B), (38C), and (38D). Vibratory feeders (3) and (18) can be programmed via the central system controller to employ the transducer load cell (56) for maintaining a constant mass of articles, ensuring that the vibratory feeders (3) and (18) are discharging the same mass flow rate that one or the other (3) and (18) receives and does not accumulate or dissipate mass. Thus, different sized articles within the article flow are transported at the same rate because the momentary mass flow rate exiting the vibratory feeders (3) and (18) equals the momentary entering mass flow rate at a given point in time of the rotary trough dispenser (33). The transducer load cell (56) can, but not necessarily, be a single point load cell, bending beam load cell, compressive force load cell, tensile load cell, or any combination thereof.

The central system controller can include a processor for use in accordance with vibratory weigh methods, article dispensation methods including automating duty cycle and velocity measurements and adjustments, as well as increasing production and lowering the giveaway. Further, the central system controller can be used to automate operation of actuators, sensors, and other mechanisms within the article dispensing system (1). An exemplar central control system is the industry standard PLC with computer user interface.

Figure 4:
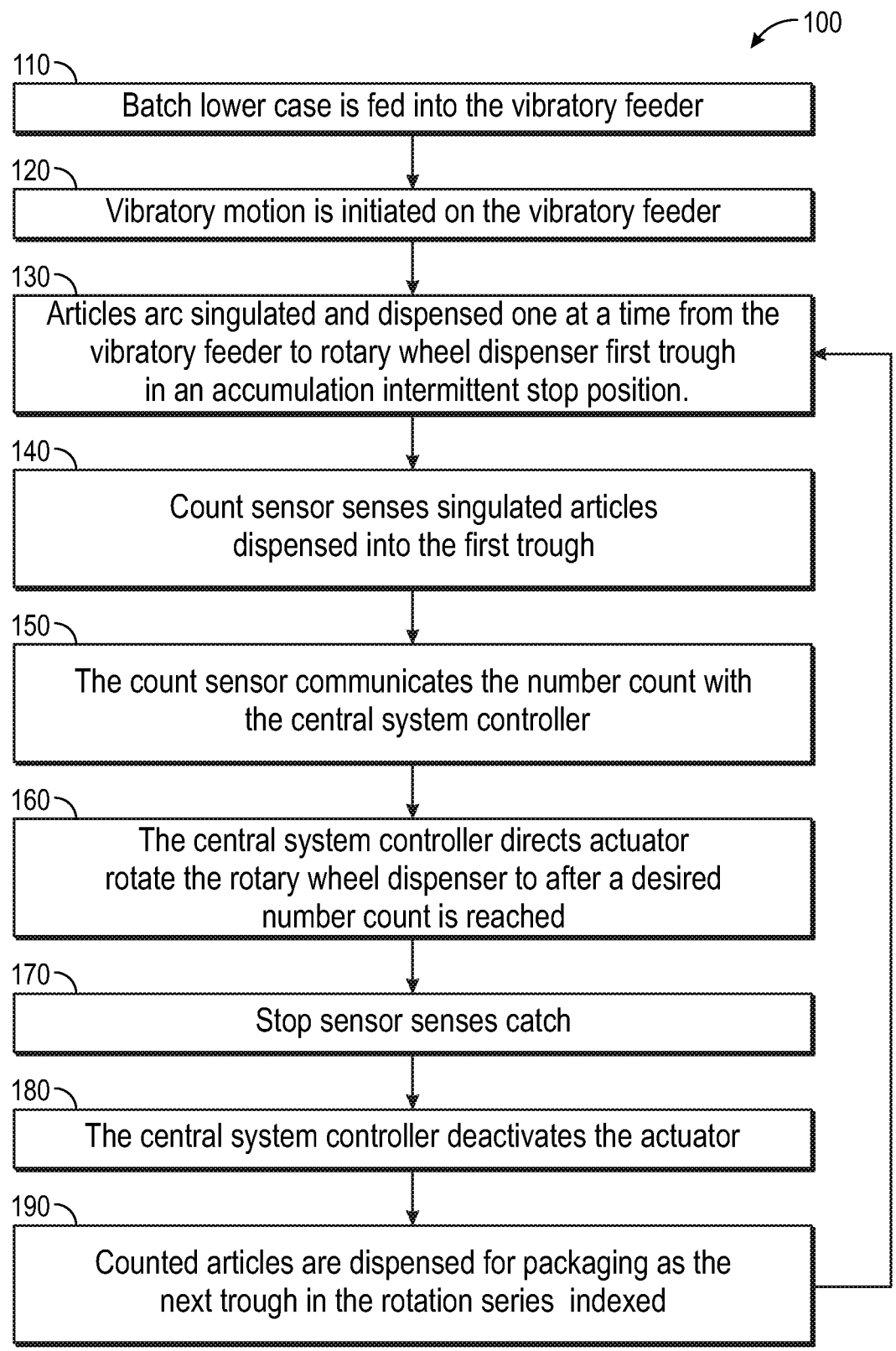
FIG. 4 is a flow diagram for dispensing counted articles of an embodiment of an article dispensing system.
Figure 5:
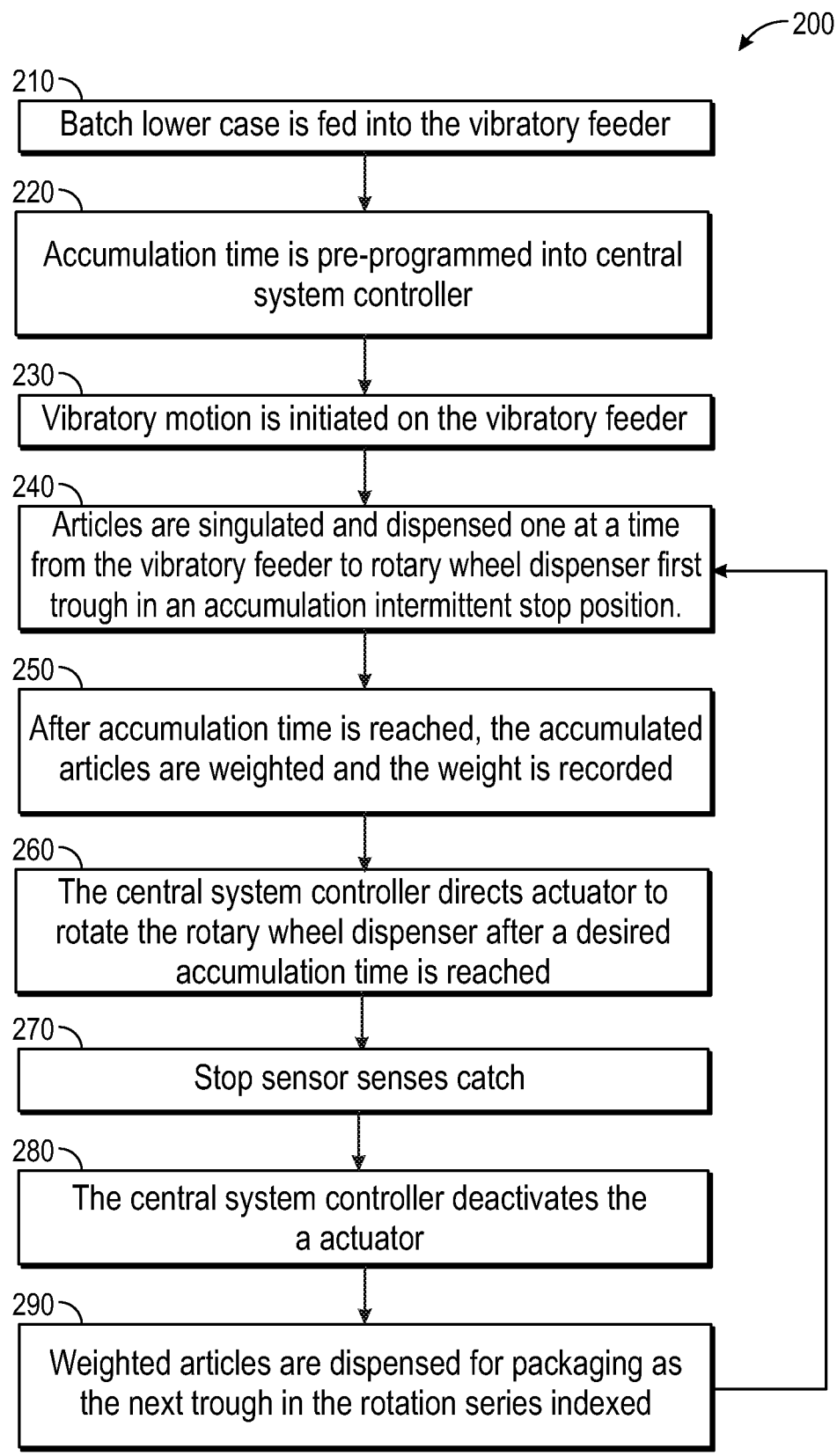
FIG. 5 is a flow diagram for dispensing weighed articles of an embodiment of an article dispensing system.

With reference primarily to FIG. 4 and FIG. 5, the article dispensing system (1) provides the dispensation of articles in conjunction with counting each dispensed article or measuring a physical characteristic, e.g., a weight, a volume, a density, or the like, of each dispensed article, so that predetermined and preprogrammed quantities of articles may be packaged.

Referring primarily to FIG. 4 and with continuing reference to FIG. 1, FIG. 2, and FIG. 3 process steps (100) for counting singulated articles includes feeding batch product into the vibratory feeder (110), initiating the vibratory motion (120), singulating the articles and dispensing one-at-a-time the articles from the vibratory feeder to the rotary trough dispenser first trough in an accumulation position (130). Next, the count sensor senses the singulated articles (140), then communicates the number count with the central system controller (150). The central system controller (150) directs the actuator to rotate the rotary trough dispenser after a desired number count is attained (160). The stop sensor then, senses the catch (170). The central system controller (150) deactivates the actuator (180). Counted articles are dispensed for packaging as the next trough in the rotation series is indexed (190). The process (100) becomes a continuous process.

Referring primarily to FIG. 5 and with continuing reference to FIG. 1, FIG. 2, FIG. 3, and FIG. 4 process steps (200) for measuring weight of singulated articles includes feeding the batch product into the vibratory feeder (210). Accumulation time is preprogrammed into the central controller (220), then vibratory motion is initiated on the vibratory feeder (230). Next, articles are singulated and dispensed one-at-a time from the vibratory feeder to a rotary wheel dispenser first trough in an accumulation position (240). After accumulation time is reached, the accumulated articles are weighed and the weight is recorded (250). The central system controller directs the actuator to rotate the rotary trough dispenser after a desired accumulation time is reached (260). In this case, time is fixed but total weight of articles may vary. In other examples when a desired weight is programmed, article pieces are discharged into the rotary wheel dispenser and when the target weight is achieved the central system controller directs the actuator to rotate the rotary trough dispenser, irrespective of time. In this case weight is fixed but time may vary. The stop sensor senses the catch (270). Next, the central system controller deactivates the actuator (280). Weighed articles are dispensed for packaging as the next trough in the rotation series is indexed (290). The process 200 becomes a continuous process.

An example of the article dispensing system in use is given below in Table-1:

TABLE 1

| S.N | Product | Typical weights |
| --- | --- | --- |
| 1 | Snacks | 1 lb./Minute |
| 2 | Veggies | 0.5 lb./Minute |
| 3 | Sea food | 2.0 lb./Minute |
| 4 | Metal parts | 3.5 lb./Minute |
| 5 | Plastic parts | 2.0 lb./Minute |

Other desired weights and speeds for singulated articles can be easily achieved using the article dispensing system (1). In Table-1, snacks can include potato chips, corn chips, pretzels or the like; fresh veggies can include cut corn, cut carrots, broccoli, peas or the like; sea food can include oysters, mussels, scallops or the like; metal parts can include bolts, rings or the like; plastic parts can include toy parts etc. If an article is weighed for packaging purposes, and the index time is 5 seconds and the accumulated weight is 5 lbs., then the rate=5 lbs. divided by 5 sec.=1 lb./sec.=60 lbs./min.=3600 lbs./hr.

Referring to FIG. 1, FIG. 2 and FIG. 3, another configuration would have a single vibrating feeder (3) feeding the rotating trough dispenser (33). Likewise, the configuration may have more than one vibratory feeder mechanism. The vibratory feeder (3) may be coupled in tandem fashion so that the discharge end (7) of the vibratory feeder (3) is coupled to the infeed end (4) of the next vibratory feeder (3).

While the invention has been particularly shown and described with reference to exemplar embodiments, it will be understood by those skilled in the art that various changes in form and detail may be made therein without departing from the spirit and scope of the invention.

What is claimed is:
1. An article dispensing system, comprising:
   a first vibratory feeder having a first vibratory feeder infeed end and a first vibratory feeder discharge end;
   a second vibratory feeder having a second vibratory feeder infeed end and a second vibratory discharge end, the second vibratory feeder infeed end in-line and disposed below the first vibratory feeder discharge end;
   a rotary trough dispenser with one or more troughs, the rotary trough dispenser in-line with and disposed below the second vibratory feeder discharge end;
   a first oscillatory drive operably connected to the first vibratory feeder, wherein the first oscillatory drive imparts periodic movements urging the articles toward the first vibratory feeder discharge end;
   a second oscillatory drive operably connected to the second vibratory feeder, wherein the second oscillatory drive imparts periodic movements urging the articles toward the second vibratory feeder discharge end;
   a controller operably connected in combination to the first and second oscillatory drives and the rotary trough dispenser, wherein the controller operably connects to the rotary trough dispenser through an actuator comprising a motor, a shaft and screw assembly, a rotor assembly, a bearing, and a stop sensor, whereby the actuator rotates the rotary trough dispenser, wherein the stop sensor comprises a stop sensor signal corresponding to a position of accumulation for the rotary trough dispenser;
   a transducer operably connected to the controller, wherein the transducer comprises a load cell signal corresponding to a weight of the articles received in the one or more troughs of the rotary trough dispenser; and
   a sensor operably connected to the controller.

2. The article dispensing system of claim 1, wherein the first vibratory feeder further comprises a plurality of removably mounted pans arranged in a cascading sequence from the first vibratory feeder infeed end to the first vibratory feeder discharge end.

3. The article dispensing system of claim 2, wherein the pans, having articles to be dispensed therein, comprise a generally U-shape in transverse section whereby the articles therein are urged toward the longitudinal centerline thereof.

4. The article dispensing system of claim 1, wherein the second vibratory feeder further comprises a plurality of removably mounted pans arranged in a cascading sequence from the second vibratory feeder infeed end to the second vibratory feeder discharge end.

5. The article dispensing system of claim 4, wherein the pans, having articles to be dispensed therein, comprise a generally U-shape in transverse section whereby the articles therein are urged toward the longitudinal centerline thereof.

6. The article dispensing system of claim 1, wherein the second vibratory feeder vibrates at a higher feed rate than the first vibratory feeder whereby the articles are accelerated to form a single row in at least the pan arranged toward the second vibratory feeder discharge end of the second vibratory feeder.

7. The article dispensing system of claim 1, wherein the sensor comprises a signal corresponding to a number of the articles discharged from the second vibratory feeder discharge end.

8. A method of counting singulated articles, comprising:
feeding articles into a first vibratory feeder;
initiating vibratory motion of the vibratory feeder;
urging the articles to a second vibratory feeder;
arranging the articles in a single row;
discharging one-at-a-time the articles from the second vibratory feeder to a rotary trough dispenser;
counting the singulated articles;
rotating the rotary trough dispenser once a desired count is attained; and
dispensing the articles in packaging containers.

9. A method of weighing singulated articles, comprising:
feeding articles into a first vibratory feeder;
initiating vibratory motion of the vibratory feeder;
urging the articles to a second vibratory feeder;
arranging the articles in a single row;
discharging one-at-a-time the articles from the second vibratory feeder to a rotary trough dispenser;
weighing the singulated articles discharged into a trough of the rotary trough dispenser;
rotating the rotary trough dispenser once a desired weight is attained; and
dispensing the articles in packaging containers.

10. An article dispensing system, comprising:
a plurality of vibratory feeders having a vibratory feeder infeed end and a vibratory feeder discharge end;
an oscillatory drive operably connected to each vibratory feeder, wherein the oscillatory drive imparts periodic movements urging the articles toward the vibratory feeder discharge end;
a rotary trough dispenser with one or more troughs, the rotary trough dispenser in-line with and disposed below the vibratory feeder discharge end, wherein the rotary trough dispenser further comprises a star wheel configuration having a plurality of dividers;
a controller operably connected to the oscillatory drive;
a transducer operably connected to the controller; and
a sensor operably connected to the controller,
wherein the vibratory feeder discharge end of each of the plurality of the vibratory feeders is in-line with and disposed above the adjacent vibratory feeder infeed end.

11. The article dispensing system of claim 10, wherein each of the plurality of vibratory feeders further comprises a plurality of removably mounted pans arranged in a cascading sequence from the vibratory feeder infeed end to the vibratory feeder discharge end.

12. The article dispensing system of claim 11, wherein the pans, having articles to be dispensed therein, comprise a generally U-shape in transverse section whereby the articles therein are urged toward the longitudinal centerline thereof.

13. The article dispensing system of claim 10, wherein the plurality of dividers extend radially to a set of perimeter blades.

14. The article dispensing system of claim 13, wherein a trough is formed between a pair of the plurality of dividers.

* * * * *